Oct. 14, 1958
J. F. GIBBONS
2,856,585
ELECTRICAL MEASURING EQUIPMENT
Filed Feb. 10, 1954
3 Sheets-Sheet 3
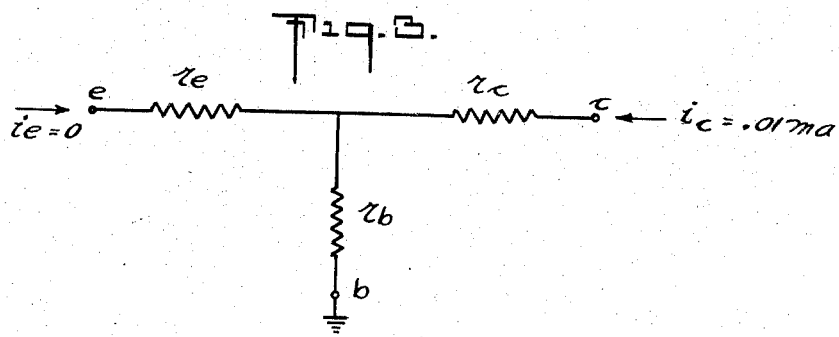
$$V_{eb} = i_c\, r_b = r_b \times 10^{-5}$$
$$V_{cb} = i_c(r_c + r_b) \simeq r_c \times 10^{-5}$$
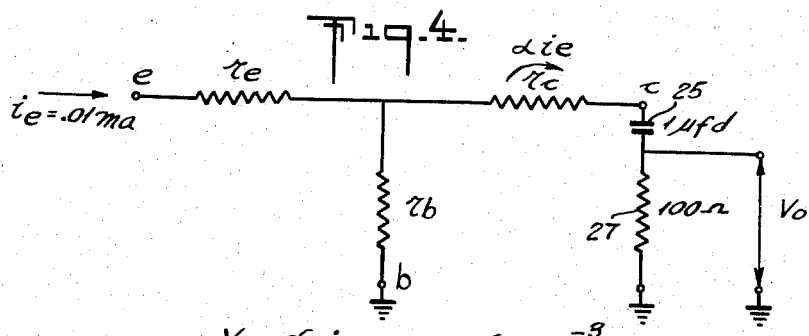
$$V_o = \alpha\, i_e \times 100 \quad \alpha \times 10^{-3}$$
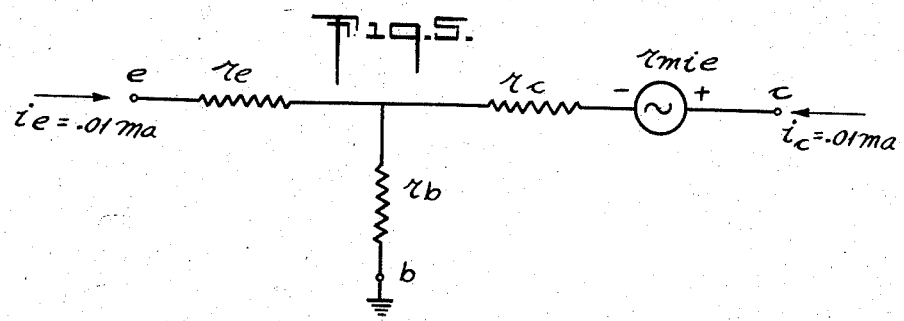
$$V_{eb} = i_e(r_e + r_b) + i_c\, r_b$$
$$i_e = -i_c$$
$$\therefore V_{eb} = i_e\, r_e = r_e \times 10^{-5}$$
INVENTOR
JAMES F. GIBBONS
BY
Eyre, Mann & Burrows
ATTORNEYS United States Patent Office 2,856,585
Patented Oct. 14, 1958

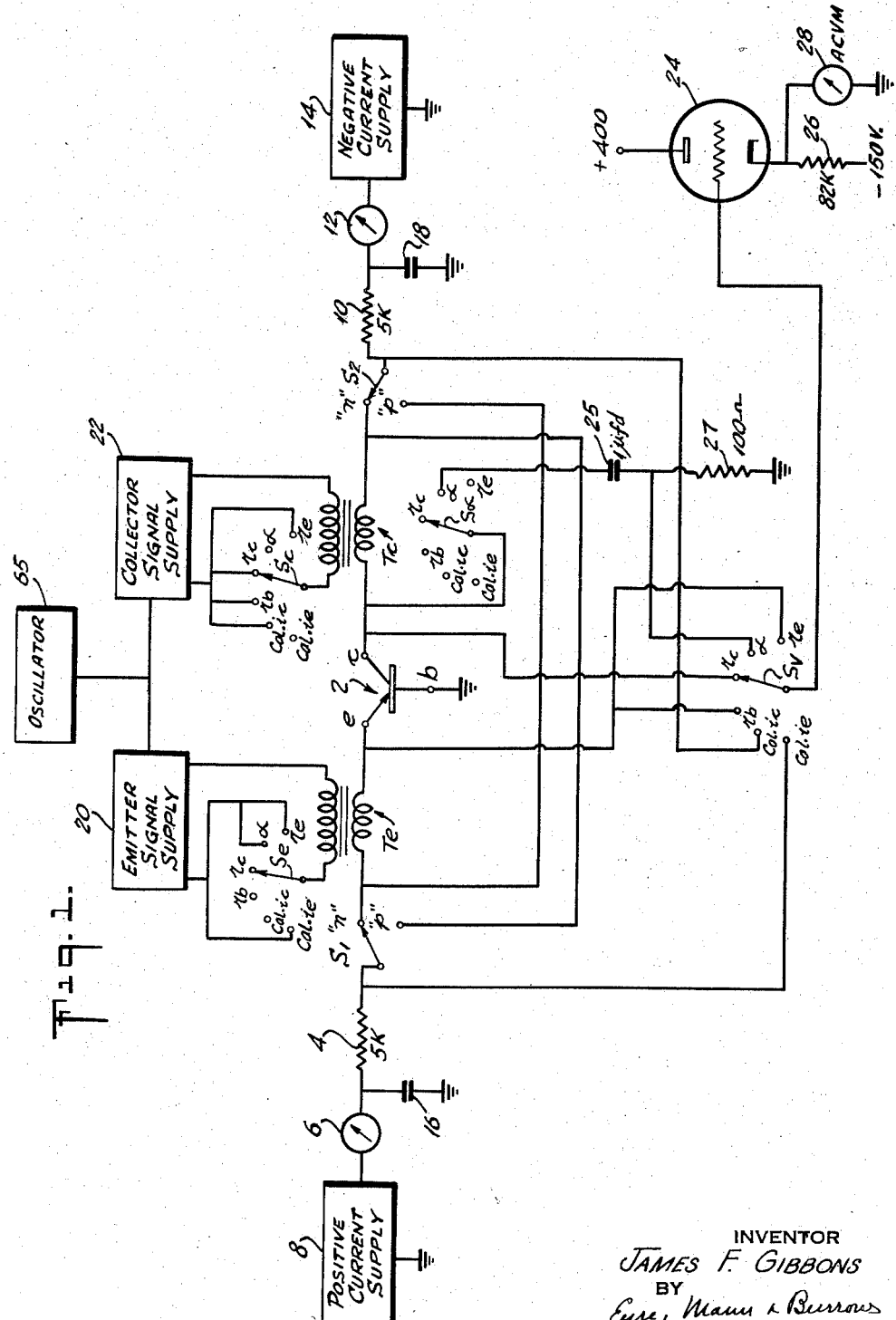

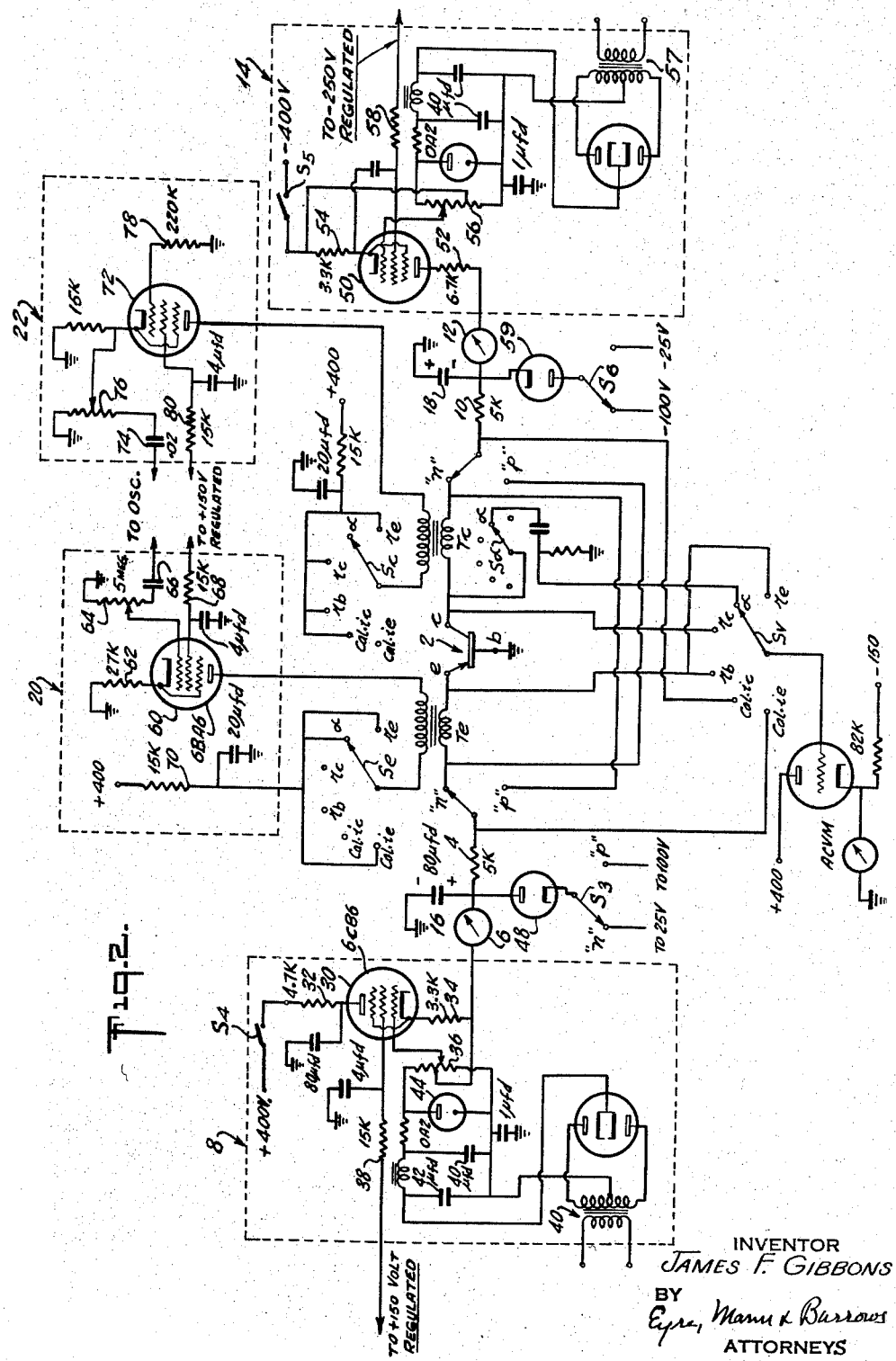

2,856,585
ELECTRICAL MEASURING EQUIPMENT

James F. Gibbons, Texarkana, Tex., assignor to Tung-Sol Electric Inc., Newark, N. J., a corporation of Delaware Application February 10, 1954, Serial No. 409,309

1 Claim. (Cl. 324—158)

The present invention relates to the measurement of alternating current equivalent circuit parameters of transistors and comprises novel test equipment for such measurements which is of high accuracy and of relatively simple circuitry. The new equipment is simple to operate and is suitable for use in testing both point type and junction type transistors.

A feature of the invention which avoids the problems inherent in construction of very high output impedance direct current bias supplies and which insures against oscillation of transistors during test is the inclusion of means for inserting the alternating current signals in series with the biasing current instead of in parallel therewith as in conventional transistor test apparatus. Other features of the new tester are the simplified bias supplies which include pentodes with floating grid bias supplies, the provision for interchange of the bias supplies for testing either n-p-n or p-n-p transistors, a low impedance circuit adapted to be switched into the circuit to provide an effective short circuit of the collector when measuring the short-circuit current amplification factor and the circuit arrangement whereby the collector and emitter signals are introduced in opposite phase to simplify measurement of $r_e$, the equivalent emitter resistance.

Briefly, the new test equipment comprises two bias supplies the current output terminal of each of which is connected through a standard resistance, used for calibrating the emitter or collector signal current, and through the secondary of a transformer, to the emitter or collector of the transistor under test. The bias supply side of each of the standard resistors is connected to ground through a condenser of large capacity to provide an effective ground for the signal current, the source of which is connected to the primary of the transformer. A single oscillator feeds both signal sources and each signal source includes means for adjusting the magnitude of the injected signal. An alternating current voltmeter connected across the load of a cathode follower is provided for reading the various voltages indicative of the transistor parameters to be measured and direct current meters in the bias supplies are provided to insure maintenance of the set at the desired operating conditions. A multiple switch connects the grid of the cathode follower tube to the transistor terminals or to the standard resistors and simultaneously opens or closes the signal circuits in accordance with the particular parameter to be measured.

For a more detailed explanation of the new test equipment reference may be had to the accompanying drawings of which;

Fig. 1 is a simplified circuit diagram of a transistor test equipment embodying the invention and shown connected to a transistor to be tested;

Fig. 2 is a diagram similar to Fig. 1 but showing the circuit elements of the signal and bias supplies;

Figs. 3, 4 and 5 are diagrams of transistor equivalent circuits explanatory of the operation of the test equipment.

The parameters measured by the new equipment are those of the grounded base equivalent T network. They are $r_e$, $r_c$, $r_b$ and $\alpha$, being respectively the equivalent emitter, collector and base resistances and the short-circuit amplification factor as defined in standard texts. (See, for example, pp. 34 to 36 of "Principles of Transistor Circuits," edited by Richard E. Shea and published by John Wiley & Sons, Inc.)

The tester of the invention will first be described with reference to the simplified diagram of Fig. 1. A transistor to be tested is indicated at 2 with its base terminal $b$ grounded and with emitter and collector terminals at $e$ and $c$, respectively. The emitter terminal $e$ is connected through the secondary of a step-down transformer $T_e$ to one fixed terminal "$n$" of a two-position switch $S_1$ and to one fixed terminal "$p$" of a two-position switch $S_2$. Similarly the collector terminal $c$ is connected through the secondary of a step-down transformer $T_c$ to the other fixed terminal "$n$" of switch $S_2$ and to the other fixed terminal "$p$" of switch $S_1$. The movable arm of switch $S_1$ is connected through a standard resistor 4, shown as a 5K resistor, and a D. C. meter 6, to a supply 8 of positive current and the movable arm of switch $S_2$ is similarly connected through a standard 5K resistor 10 and D. C. meter 12 to a source 14 of negative current supply. The junction of resistor 4 and meter 6 is effectively grounded to alternating current by a large capacitor 16 of, for example, 80 microfarads. A similar capacitor 18 effectively grounds the junction of resistor 10 and meter 12 for alternating current. An emitter signal supply 20 has one output terminal connected to one end of the primary of transformer $T_e$ and its other output terminal connected to three fixed terminals of a six-position multiple switch, the cooperating movable arm $S_e$ of which is connected to the other end of the primary of transformer $T_e$. Similarly a collector signal supply 22 has one output terminal connected to one end of the primary of transformer $T_c$ and its other output terminal connectible to the other end of the primary through the movable arm $S_c$ and four of a set of six positions of the multiple switch.

The multiple switch is shown only diagrammatically in the drawings. It includes, in addition to the movable arms $S_e$ and $S_c$, two other movable arms $S_a$ which is connected to terminal $c$ of the transistor and $S_v$ which is connected to the control grid of a cathode follower tube 24. It will be understood that all of the movable arms are ganged together for conjoint movement but are electrically insulated from each other. The six fixed terminals of each set are similarly identified to indicate the parameter being measured at the respective switch positions. These identifications are: "Cal. $i_e$," "Cal. $i_c$," "$r_b$," "$r_c$," "$\alpha$," and "$r_e$." Of the terminals associated with switch arm $S_e$, Cal. $i_e$, $\alpha$, and $r_c$ are connected to an output terminal of the emitter signal supply, the remaining fixed contacts being floating. Of the similarly identified set of six fixed terminals engageable by the switch arm $S_c$ and associated with the collector signal supply, terminals Cal. $i_c$, $r_b$, $r_c$, and $r_e$ are connected to an output terminal of the supply. Of the similarly identified set of six fixed terminals engageable by the switch arm $S_a$, only the $\alpha$ terminal is connected to an external circuit. The $\alpha$ terminal is connected through a condenser 25, indicated as of one microfarad, and a one hundred ohm resistor 27 to ground. Of the set of six fixed terminals engageable by the switch arm $S_v$, the $\alpha$ terminal is connected to the junction of condenser 25 and resistor 27; the $r_b$ and $r_e$ terminals are connected together and to terminal $e$ of the transistor; the $r_c$ terminal is connected to terminal $c$ of the transistor; the Cal. $i_e$ terminal is connected to the movable arm of switch $S_1$, and the Cal. $i_c$ terminal is connected to the movable arm of switch $S_2$.

The cathode follower tube 24 has a load resistor 26 connected between a point of negative potential, for example, —150 volts, and the cathode of the tube. In parallel with the load resistor 26 is a suitable high impedance alternating current voltmeter 28. The load resistor 26 may be, for example, 82K.

The positive and negative current supplies, 8 and 14, include means for adjustment of the current delivered to the transistor and the emitter and collector signal supplies likewise include means for adjusting the signal inputs. The supplies will be described more in detail in connection with Fig. 2 wherein the circuit elements of the supplies and the adjusting means for the currents are shown.

The operation of the above briefly described circuit for measurement of small signal parameters of a transistor will now be described by reference to Fig. 1 and to Figs. 3, 4 and 5. Having decided the operating point, that is, the values of the positive and negative biasing currents, the corresponding current supplies are adjusted until the meters 6 and 12 indicate the desired current. The set is then ready for calibration of the signal currents. For this calibration the multiple six-position switch is moved to the position indicated by the terminals Cal. $i_e$ and switches $S_1$ and $S_2$ are set in the position shown in the drawing, namely, with the movable arms in contact with terminals "$n$." In this position the collector signal current is zero because the primary of transformer $T_c$ is open at the Cal. $i_e$ position. An emitter signal is induced into the secondary of transformer $T_e$ and this current flows through the 5K standard resistor 4 to ground through condenser 16 and through the transistor. The voltage across the 5K resistor is applied through switch arm $S_v$ to the grid of the cathode follower 24. The emitter signal supply is then adjusted to bring the reading on the voltmeter 28 to .05 volt R. M. S. This indicates an emitter signal current of .01 ma. R. M. S. The calibration of the emitter current being thus effected, the multiple switch is thrown to the Cal. $i_c$ position and the collector signal supply adjusted in the same way to bring the voltage across the standard 5K resistor 10 to .05 volt R. M. S., thus insuring a collector current of .01 ma. R. M. S. After so calibrating the emitter and collector currents measurements of the desired parameters $r_e$, $r_b$, $r_c$ and $\alpha$ are made as follows.

To measure $r_b$ the six-position switch is moved to the $r_b$ position. In this position the emitter current is zero because the primary of transformer $T_e$ is open. The collector current is .01 milliampere as the collector signal supply has been adjusted during the calibration as above described and the primary of transformer $T_c$ is connected through terminal $r_b$ to the supply. By reference to the diagram of Fig. 3 which shows the conditions in this position of the multiple switch, it will be noted that the potential from $e$ to $b$ is equal to $i_c r_b$ as $i_e$ is equal to zero. Hence the voltmeter reading, $i_c$ being equal to .01 milliampere will be $r_b \times 10^{-5}$. The control grid of the cathode follower 24 is connected through terminal $r_b$ to the emitter terminal $e$ of the transistor and reads the potential difference between the emitter terminal and ground.

For measurement of $r_c$ the multiple switch is thrown to the $r_c$ position. The only change effected by this shift from the $r_b$ position is that the voltmeter is now connected to the terminal $c$ of the transistor, rather than to the terminal $e$. Again by reference to Fig. 3, it will be apparent that the voltage measured by the voltmeter will be equal to $i_c(r_c+r_b)$ and as $r_c$ is ordinarily many, many times larger than $r_b$, the voltage reading at this position will be substantially $r_c \times 10^{-5}$ although if greater accuracy is desired, the previously determined value of $r_b$ can be subtracted to give the exact value of $r_c$.

To measure $\alpha$, the test equipment takes advantage of the fact that a current of $\alpha i_e$ flows in a short circuited collector. Therefore, with the biases remaining, the collector signal transformer primary $T_c$ is opened and an emitter signal is injected. The 100 ohm load resistor and blocking 1 microfarad condenser are connected to the terminal $c$. The $\alpha$ position of the multiple switch corresponds to the diagram of Fig. 4 wherein the emitter signal current is .01 milliampere, the injected collector current is zero, and a current of $\alpha i_e$ is flowing in the collector. The voltmeter reading across the 100 ohm resistor will then be equal to $\alpha i_e \times 100$ or $\alpha \times 10^{-3}$.

Finally, for measurement of $r_e$, the multiple switch is thrown to the $r_e$ position in which position both emitter and collector currents are injected. However, by suitable connection of the transformer leads, these currents are made 180° out of phase and therefore the voltage developed across $r_b$ by these currents is zero. The equivalent circuit for this position of the multiple switch is shown in Fig. 5 which is the conventional T-network voltage-generator equivalent circuit wherein $r_m$ is the equivalent emitter-collector transresistance. As indicated in that figure with $i_e$ and $i_c$ each equal to .01 milliampere the voltage across the terminals $e$ and $b$ is equal to $i_e r_e$ or $r_e \times 10^{-5}$.

Measurement of each of the desired parameters has now been briefly explained. With the switches $S_1$ and $S_2$ in the positions shown in Fig. 1, it is assumed that the transistor is of the n-base type. If the transistor is of the p-base type, the switches $S_1$ and $S_2$ are reversed to provide a negative current supply for the emitter and a positive current supply for the collector. Although the transistor has been diagrammatically illustrated as of the point contact type, no change in the equipment is necessary if a junction type transistor is to be tested.

As the transistor bias currents flow through the secondaries of the transformers $T_e$ and $T_c$, the cores of these transformers should be of high quality iron. It has been found that the type of transformers employed in television circuits for vertical deflection are suitable for the purpose of the present circuit.

Suitable current and signal supplies of simple circuitry are shown in Fig. 2, to which reference may now be had. The positive current supply includes a single pentode 30, preferably a 6CB6, the anode of which is connected to a source of +400 volts through a resistor 32, shown as a 4.7K resistor and the cathode of which is connected through a 3.3K resistor 34 to the meter 6 and to the mid-point of a current adjustment potentiometer 36, a movable tap on which is connected to the first grid of the pentode 30. A 150 volt regulated source is connected through a 15K resistor 38 to the second grid of the pentode 30. Rectified voltage from an input transformer 40 is applied across potentiometer 36 through a smoothing filter 42. A voltage regulator tube 44 is connected across the potentiometer 36. A protective biased diode 48 has its cathode connectible through a switch $S_3$ to sources of positive potential, specifically 25 volts and 100 volts, corresponding to n-base and p-base type transistors and its anode connected to the junction of meter 6 and standard resistor 4. A switch $S_4$ in the anode circuit of tube 30 permits the bias supply to be disconnected if desired. The negative power supply is generally similar to the positive supply above briefly described. It includes a pentode 50, the anode of which is connected through a 6.7K resistor 52 to the meter 12 and the cathode of which is connected through a 3.3K resistor 54 and control switch $S_5$ to a —400 volts source of negative potential. A current adjusting potentiometer 56 has its mid-point connected to the low potential end of resistor 54 and a movable tap thereon connected to the first grid of the pentode 50. Regulated potential is applied across the potentiometer 56 from an input transformer 57, the voltage across which is rectified and filtered. The second grid of the pentode 50 is connected through a resistor 58 to a source of —250 volts regulated.

A biased diode 59 has its cathode connected to the junction of standard resistor 10 and meter 12 and its anode connectible through a switch $S_6$ to sources of negative potential of 100 volts and of 25 volts depending upon whether the transistor is of the n-base or the p-base type.

The emitter A. C. signal supply comprises a pentode 60, the cathode of which is connected to ground through a 27K resistor 62 and the anode of which is connected to one end of the primary of transformer $T_e$. The No. 1 grid of the pentode 60 is connected to a tap on a 5 megohm resistor 64, one end of which is grounded and the other end of which is connected through a condenser 66 to a 2000 C. P. S. oscillator 65 (see Fig. 1). The second grid of the pentode is connected through a 15K resistor 68 to a point of regulated positive potential of 150 volts. The fixed terminals Cal. $i_e$, $\alpha$, and $r_e$ of the set of six terminals associated with switch arm $S_e$ are connected through a 15K resistor 70 to a point of +400 volts. Adjustment of the tap on resistor 64 adjusts the current through the primary of transformer $T_e$ when the switch arm $S_e$ is in position to close the circuit of the primary. The collector A. C. signal supply is generally similar to that of the emitter A. C. signal supply except that the tube thereof is cathode, rather than grid, fed to increase the output impedance and thereby insure substantially constant collector current irrespective of the impedance of the collector side of the particular transistor under test. For this purpose the cathode of a pentode 72 is fed from the oscillator 65, the oscillator being connected through a condenser 74 to the ungrounded end of a 5 meg. resistor 76, a tap on which is connected to the cathode of the pentode 72. The first grid of the pentode is connected through a biasing resistor 78 of 220K to ground and the second grid is connected to a regulated source of +150 volts through a 15K resistor 80. Adjustment of the collector current is made by adjustment of the position of the tap on resistor 76. The emitter signal supply could also be cathode fed if desired but as there is relatively less variation in impedance of the emitter side of different transistors a high output impedance of the supply is not required.

The invention has now been described in connection with the preferred embodiment thereof and specific values of the various circuit elements have been indicated in the drawing and have been specified in the description. Obviously, however, these specific values have been given as illustrative and as indicative of suitable magnitudes. The particular circuit shown in the drawings has been found to measure the desired parameters with an accuracy of 3% or better. A convenient check of the tester may be made by inserting a T-pad of known resistance values in the place of the transistor. The equipment has been found to provide accurate measurements of such T-pads simulating transistors with collector impedances of as high as 5 megohms without sacrificing accuracy in measuring impedances in the 10–1000 ohm range. If desire, an oscilloscope may be connected across the cathode follower load to yield visual indication of the waveform purity and of points at which distortion of the signal occurs.

By the injection of the A. C. signals into transistors in series with the D. C. biasing currents by means of the transformers $T_e$ and $T_c$, high output impedance D. C. supplies are avoided. Also, because of the omission of such high impedances, there is no tendency of a transistor to oscillate under test conditions. Extreme precautions to avoid hum and other undesirable signals are unnecessary since a large amount of decoupling is provided before the bias currents are injected. The D. C. meters in the bias supplies provide means for continuous reading of the bias currents and thus, together with the biased diodes insure against damage to the transistor under test which might result if D. C. bias voltages only were measured.

The following is claimed:

A transistor test set comprising direct current positive and negative supplies, connections therefrom to emitter and collector terminals for delivery of bias currents to a grounded base transistor to be tested, separate emitter and collector signal current sources, inductive means for optionally injecting signal currents from said sources into said connections, a standard resistor in each of said connections interposed between the associated supply and inductive means and means for effectively grounding to alternating current the supply end of each standard resistor whereby the emitter and collector signal currents may be determined by measuring the alternating voltage across the associated standard resistor for given bias currents and in the absence of the other signal current, and the equivalent base and collector resistances for such bias currents may be determined by measuring respectively, the alternating voltage between the emitter terminal and ground and the collector terminal and ground when a collector signal only is injected, said inductive means introducing emitter and collector signals in opposite phase whereby the equivalent emitter resistance for given bias currents may be determined by measuring the alternating voltage between the emitter terminal and ground when equal emitter and collector currents are injected.

References Cited in the file of this patent

UNITED STATES PATENTS 2,577,803   Pfann _____ Dec. 11, 1951

OTHER REFERENCES

"Testing Transistors," Lehovec, Electronics, June 1949, pp. 88–89.

Principles of Transistor Circuits, R. F. Shea, pp. 495–496.

"Apparatus for Testing Transistors," Jochems et al., Philips Technical Review, vol. 13, No. 9, March 1952, pp. 254–265.